United States Patent [19]
Sokolowski

[11] 4,313,250
[45] Feb. 2, 1982

[54] TOOL FOR REPLACEMENT OF GOLF CLUB GRIP

[76] Inventor: Bronislaw Sokolowski, 44 Aldrich St., Webster, Mass. 01570

[21] Appl. No.: 104,266

[22] Filed: Dec. 17, 1979

[51] Int. Cl.[3] .................... B23P 19/02
[52] U.S. Cl. .................... 29/235; 29/270
[58] Field of Search .................... 29/235, 235.5, 236, 29/270, 280, 282; 229/52 AW

[56] References Cited

U.S. PATENT DOCUMENTS

| | | | |
|---|---|---|---|
| 101,655 | 4/1870 | Palmer . | |
| 1,109,094 | 9/1914 | Weckbaugh . | |
| 1,196,496 | 8/1916 | Sykes | 220/95 |
| 1,338,576 | 4/1929 | Keys . | |
| 2,038,840 | 4/1936 | Hall . | |
| 2,669,772 | 2/1954 | Hamler | 29/270 |
| 2,844,146 | 7/1958 | Perdue | 29/235 |
| 4,068,364 | 1/1978 | Tharp et al. | 29/235 |

*Primary Examiner*—James L. Jones, Jr.
*Attorney, Agent, or Firm*—Norman S. Blodgett; Gerry A. Blodgett

[57] ABSTRACT

A tool useful for the placement of a golf club grip. The tool includes a handle with an elongated notch and an elongated blade parallel with the notch and is tapered to a point. The blade also is provided with a convex arcuate surface on one side and a flat surface on the other side that faces in the same direction as the notch. In operation the tool is applied to a hand grip to form an opening between the grip and club shaft.

1 Claim, 21 Drawing Figures

TOOL FOR REPLACEMENT OF GOLF CLUB GRIP

BACKGROUND OF THE INVENTION

There are many occasions in which a golfer wishes to replace the grip on one or more of his golf clubs. For instance, if the grip on a favorite club becomes worn, he may wish to provide it with a new grip instead of buying a new club. On some occasions, he may be convinced that his old grip has the wrong shape or material and he wishes to use the same golf club with another grip. Even during the sale of a new set of clubs, the purchaser may desire a certain make or model of club, but may wish to have a grip of a different manufacturer on that club. Also, the customer may wish the grip to be larger or smaller to fit his hand; in such case, the adjustment is made by use of layers of tape between the shaft and the grip. In all of these cases, it is necessary to remove the grip and replace it. Unfortunately, in the past this has been a difficult procedure. The first problem that one encounters is the removal of the old grip. While this can be accomplished by simply slitting the old grip axially with a razor and then peeling the remainder away from the golf club shaft, such a procedure has the disadvantage that it destroys the grip. Obviously, in the case of a new golf club, the destruction of the new grip is an economic loss which must be passed on the purchaser. Furthermore, even old golf grips have some resale value, since a well-made grip is an expensive element of the golf club. Although the adhesive tape locking a grip to its club shaft is soluble, in the past professional golf shops have attempted to peel the grip off without damaging it, but this has always been a very difficult procedure to carry out. The second difficulty lies in the application of the new grip. Although there is a standard outside diameter for golf club shafts and a standard internal diameter for grips, it is difficult to insert the large diameter shaft into a small diameter grip particularly where various layers of tape are used. Furthermore it is necessary that the resilience of the rubber-like grip be used to clamp the grip firmly on the shaft of the golf club. This means, that, even if the shaft and tape is of small diameter and would fit neatly into the opening in the grip, it is necessary to build up the diameter of the shaft with tape, so that the ultimate fit of the grip is very tight. In either case (whether large diameter shaft or shaft that has been built up with tape) it is almost impossible to insert the shaft into the grip with damaging the grip. These and other difficulties experienced with the prior art devices have been obviated in a novel manner by the present invention.

It is, therefore, an outstanding object of the invention to provide a method for easily and neatly replacing the grip on a gold club.

Another object of this invention is the provision of a method for removing a grip from a golf club and replacing it with a new grip of another type without damaging either grip.

A further object of the present invention is the provision of a tool system for neatly removing an old grip from a golf club and inserting the shaft into a new grip.

It is another object of the present invention to provide a tool for easily removing a grip from a golf club without damaging it by tearing it or making holes.

A still further object of the invention is the provision of a tool for inserting a golf club shaft into a new grip.

It is a further object of the invention to provide a tool for assisting in the insertion of a shaft into a golf club grip, which tool is simple in construction and inexpensive to manufacture, and which is capable of a long life of useful service.

With these and other objects in view, as will be apparent to those skilled in the art, the invention resides in the combination of parts set forth in the specification and covered by the claims appended hereto.

SUMMARY OF THE INVENTION

In general, the invention consists of a system for replacing the grip of a golf club that consists of removing the grip without damaging it and of inserting the shaft easily into the same or a new grip. The grip is removed by use of wedge-shaped awl which provides openings between the grip and the shaft for the insertion of a solvent. The shaft is inserted into the new grip by use of an expander which temporarily enlarges the opening in the resilient grip for the insertion of the shaft. The awl is inserted into a plurality of positions around the periphery of the shaft and is inserted further into the grip as the solvent dissolves the adhesive on the tape.

More specifically, the awl includes a long, thin blade which is tapered to a point at the end farthest from its handle and is provided with a flat surface to lie along the shaft and with an arcuate surface to contact the grip. The expander consists of two identical rigid main bodies of semicircular tubular shape which, when held together with their interior surfaces facing one another, provide a conduit for sliding the shaft into the new grip. The bodies have blades which serve to stretch the opening into the grip.

BRIEF DESCRIPTION OF THE DRAWINGS

The character of the invention, however, may be best understood by references to one of its structural forms, as illustrated by the accompanying drawings, in which.

DESCRIPTION OF THE PREFERRED EMBODIMENT

Figure 1:
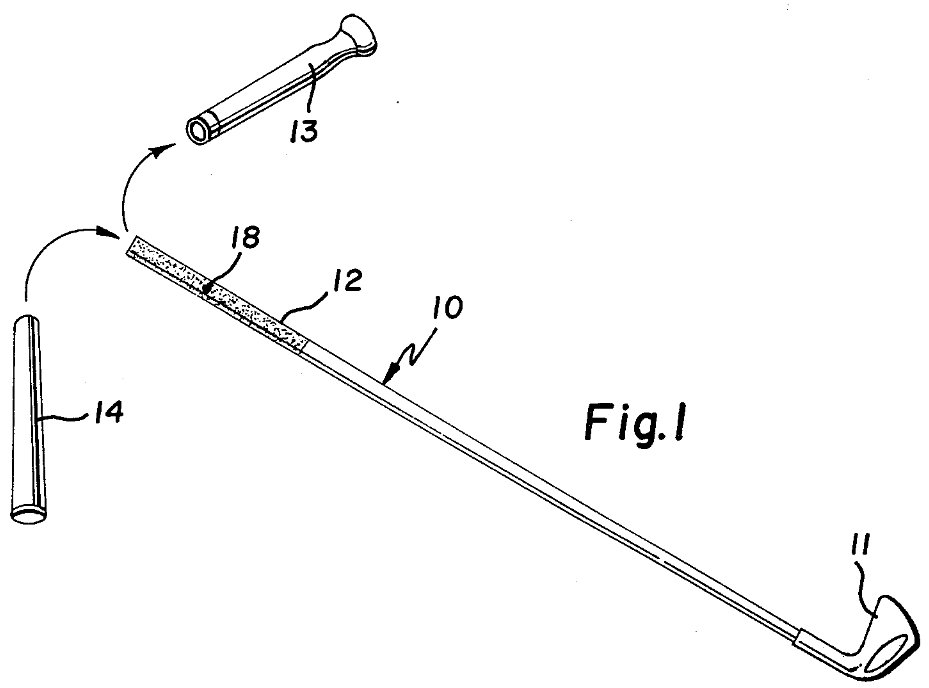
FIG. 1 is a perspective view of a golf club with an old and new grip.

Referring first to FIG. 1, which best shows the general features of the invention, the golf club, indicated generally by the reference numeral 10, is shown as having a shaft 12 at the end of which is provided a head 11. An old grip 13 is shown as being removed and a new grip 14 being mounted on the end of the shaft 12 to which a coating 18 of adhesive tape has been applied.

It will be understood that, while the description has to do with the removal of an "old" grip and replacing it with a "new" grip, it is intended to also mean the removal of a grip and the replacement of the same grip.

Figure 2:
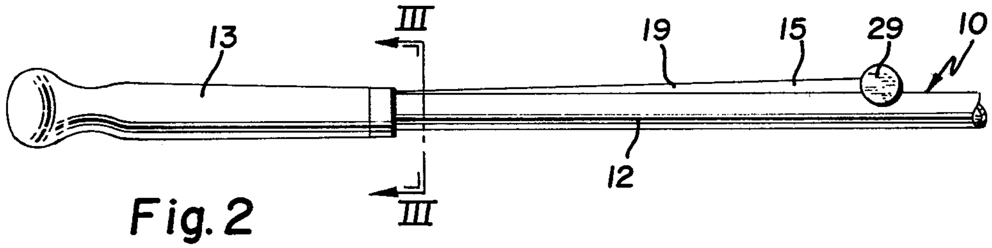
FIG. 2 is a front elevational view of a golf club showing an awl in use.
Figure 3:
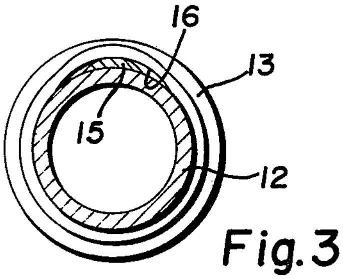
FIG. 3 is a transverse sectional view of the golf club and awl taken on the line III—III of FIG. 2.

In FIGS. 2 and 3 it can be seen that an awl 15 is being inserted between the old grip 13 and the shaft 12 of the club 10. The awl has a handle 29 and a tapered blade 19. The awl 15 provides openings 16 on either side of the blade into which solvent can be poured.

Figure 4:
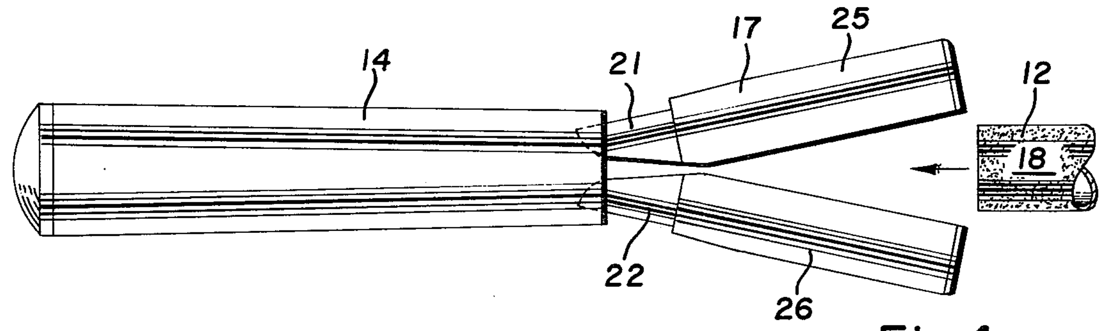
FIG. 4 is a front elevational view of the club showing an expander in use.
Figure 5:
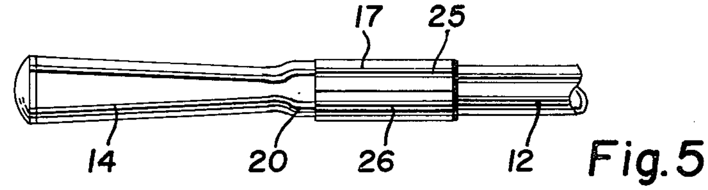
FIG. 5 is a similar front elevational view of the club showing the expander in use.

In FIG. 4 it can be seen that a new grip 14 has applied to it an expander 17 and that the end of the shaft (provided with a new coating 18 of tape with adhesive on both sides) is being inserted into the grip 14 by insertion between the two main bodies 25 and 26 of the expander. Blades 21 and 22 extending from the main body are inserted into the opening in the flexible grip to force it apart and to assist it in receiving the shaft. In the final stages (as shown in FIG. 5) the main bodies 25 and 26 have been closed to provide a bulge 20 in the grip, so that the shaft 12 can be slid deeply into the grip.

Figure 6:
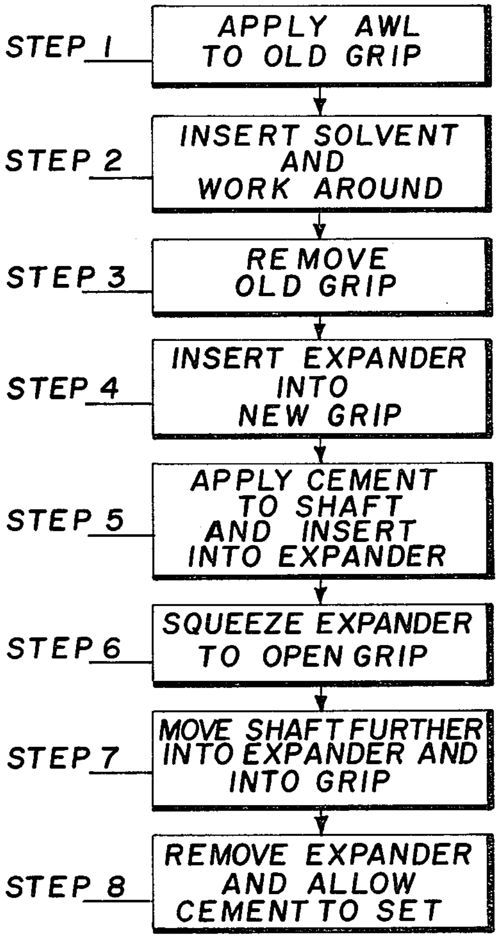
FIG. 6 is a flow diagram showing the steps of the method of replacing the golf club grip.

The method of replacing a golf club grip is shown diagrammatically in FIG. 6, wherein Step 1 consists of applying the awl 15 to the old grip 13 to form an opening 16 between the old grip and the shaft. In accordance with Step 2, solvent is dispensed into the openings 16 and the awl is inserted in various positions around the grip, while more solvent is added. As the old grip loosens up, it is possible to insert the awl further and further into the grip and to pour more solvent into the space until eventually the grip slides free. The shaft is cleaned to remove all old tape.

In accordance with Step 3, the grip is removed and, in accordance with Step 4, the expander 17 is inserted in the new grip. The new coating 18 of tape is applied to the shaft 12 and the end of the shaft is inserted between the two halves or jaws of the expander, this being in accordance with Step 5. In Step 6 the expander is squeezed to stretch the resilient grip and open it further also, the two halves are brought together to guide the shaft. In Step 7 the shaft is moved further into the expander and into the grip. In Step 8 the expander is removed and the tape is allowed to set, so that the conversion from the grip 13 is the new grip 14 has been completed.

Figure 7:
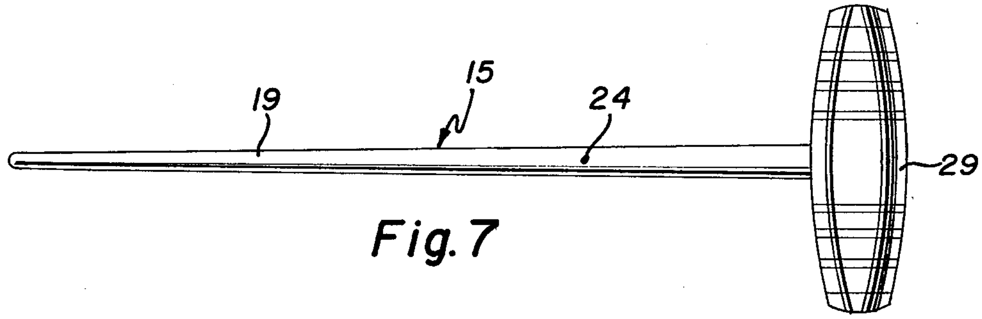
FIGS. 7 through 12 are front elevational view, rear elevational view, left-hand side view, right-hand side view, top plan view, and bottom plan view, respectively, of the awl, FIGS. 13 through 16 consist of a front elevational view, a top plan view, a left-hand end view, and a right-hand end view, respectively, of the expander.
Figure 8:
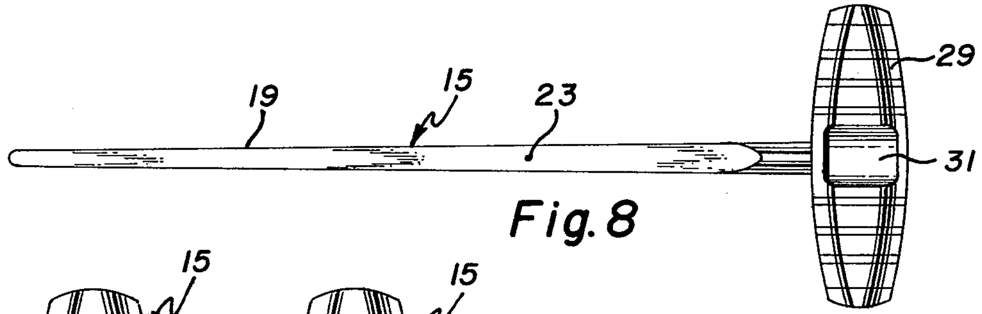
Figure 9:
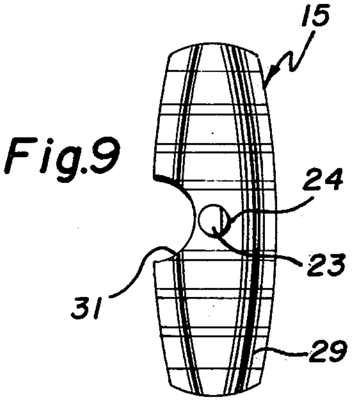
Figure 10:
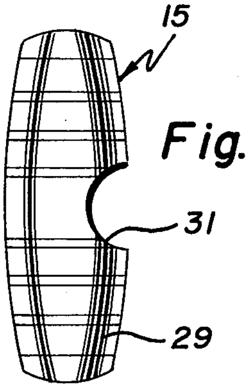
Figure 11:
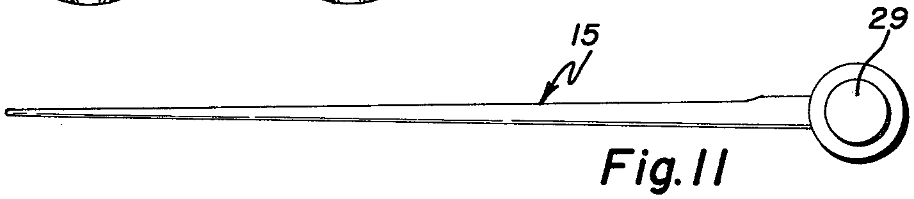
Figure 12:
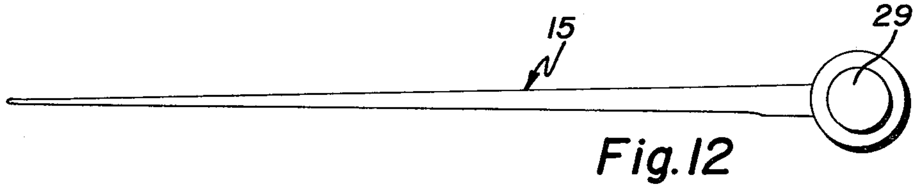

It can be seen, then, that the invention consists of a system for replacing an old golf club 13 with a new grip 14 and makes use of an awl 15 that has a long, thin blade 19 for insertion between the old grip and the shaft 12 to form openings 16 for the introduction of solvent and eventual removal of the old grip 14. The system provides an expander 17 having two thin arcuate blades 21 and 22 for insertion into the opening in the new grip 14 to stretch it to a larger size and to permit the shaft to slide easily into the new grip. The blade of the awl is provided with one flat side surface 23 and an arcuate side surface 24 (see FIGS. 7 and 8). This provides for easy insertion of the blade between the shaft and the old grip. It should be noted also that each blade 21 and 22 of the expander 17 extends axially from a semi-circular tubular main body 25 and 26, respectively. The contacting edges of the main body 25 and 26 are tapered adjacent the blade to provide a camming action when the main bodies are squeezed together to force the blades apart to open the grip further.

Referring to FIGS. 7–12, it can be seen that the awl 15 that is used in removing the old grip 13 from the golf club shaft 12, is provided with the handle 29 and the elongated blade 19. The blade is tapered to a point at the end farthest from the handle 29 and, as has been stated above, is provided with a flat surface 23 adapted to lie along the shaft and an arcuate surface 24 to contact the grip. It has been found to be useful to provide, along the length of the blade, an axial bore or longitudinal groove in the flat surface to aid in injecting solvent. It has also been found that, if the tip of the flat surface is curved back slightly, a skillful operation can remove the grip without removing the tape. The handle 29 is provided with a notch 31 to permit the blade to be inserted at a small angle to the surface of the shaft.

Figure 13:
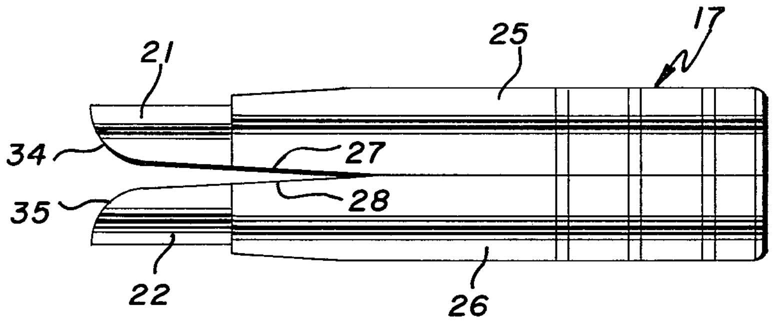
Figure 14:
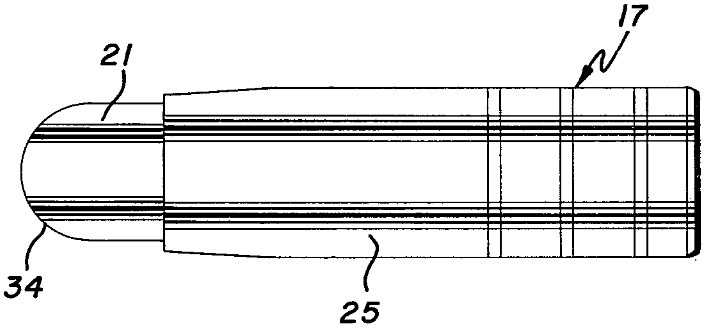
Figure 15:
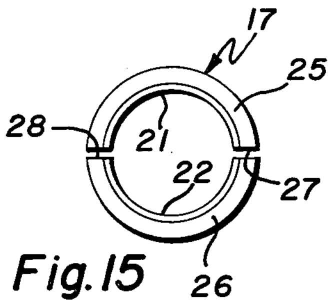
Figure 16:
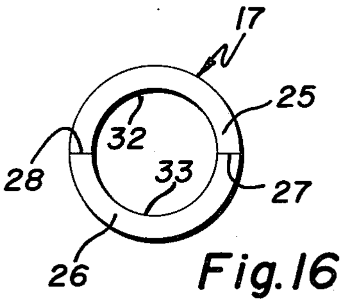

FIGS. 13 and 16 show the details of the expander 17 that is used in applying a new grip 14 to the golf club shaft 12. The two identical rigid main bodies 25 and 26 are of semi-circular tubular shape, and when held together with their interior surfaces facing one another, provide a conduit for sliding the shaft into the new grip. The thin flexible blade 21 extends from the main body 25, while a similar blade 22 extends from the main body 26, each blade having a semi-circular cross-sectional shape (see FIG. 15) for insertion into the open end of the new grip. The matching edges 27 and 28 are tapered outwardly adjacent the blades 21 and 22 to provide a rocking motion that stretches the grip and allows further insertion of the shaft.

Each of the blades 21 and 22 is provided with a symetrically-curved edge 34 and 35, respectively, to assist in insertion into the grip. FIG. 16 shows particularly well the manner in which the interior surfaces 32 and 33 are formed as interior cylindrical surfaces of semi-circular cross-section and of diameter somewhat larger than any conceivable golf shaft 12.

It can be seen, therefore, that the use of the present system permits the removal of an old golf grip 13 and the introduction of a new grip 14 without damaging either grip. This means that the old grip is available to other golf clubs or for resale. In addition to permitting the performance of the operation without damage to the grips, the operation can be formed quickly and easily, since it provides a standard system that can be used for all sizes of grips and golf club shafts. The system can be carried out either by the amateur golfer or by the professional who is in charge of the repair and sale of the golf clubs and the individual country club. Because of the speed of the operation and because there is no danger of damaging either the old grip or the new grip, it is possible for the professional golf club repairman to provide the service at a much lower cost. This, of course, stimulates more business of a similar nature. In the past, a golfer might be deterred by price from switching to a better grip on his golf club, while with the present invention he will be better able to make a desireable change.

Figure 17:
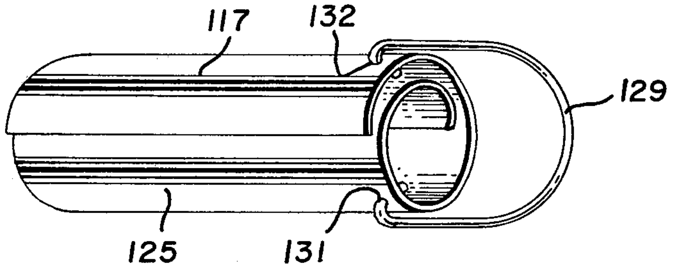
FIG. 17 is a perspective view of a modified form of the expander.

FIG. 17 shows the details of a modified form of the expander, indicated generally by the reference numeral 117. It is shown as having generally rectangular main body 125 which is made of sheet metal and is formed into an elongated scroll. The handle 129 is hingedly attached to one end of the main body for the purpose of permitting a substantial force to be applied lengthwise thereof. The handle 129 consists of a generally U-shaped bail whose ends are bent inwardly through apertures 131 and 132 formed in the main body adjacent the said one end.

Figure 18:
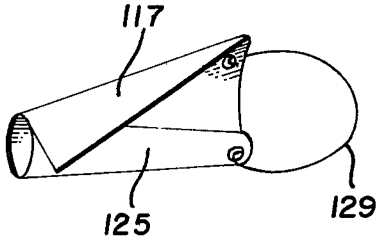
FIGS. 18 through 21 show various stages of the use of the expander shown in FIG. 17.
Figure 19:
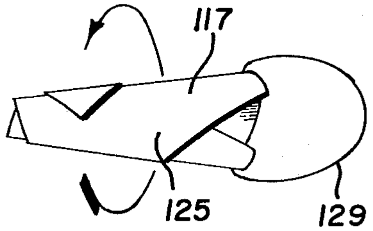

The manner in which the expander 117 is used is shown in the successive FIGS. 18 through 21. First of all, as is indicated in FIG. 18, the user lubricates the interior of the free end of the expander with adhesive that has been dissolved in kerosene or solvent. The free end is the end away from the handle 129 and the adhesive is the adhesive that presumably that has been melted in removing the old grip if an exchange operation is being performed. At the same time, the interior of the new grip 113 of the golf club 100 is also lubricated in the same manner for about one-half an inch into its interior. Referring to FIG. 19, the main body is twisted to coil into a cone-shaped configuration with the end opposite the end to which the handle is attached formed into the small end that is small enough to fit into the open end of the new grip 113.

Figure 20:
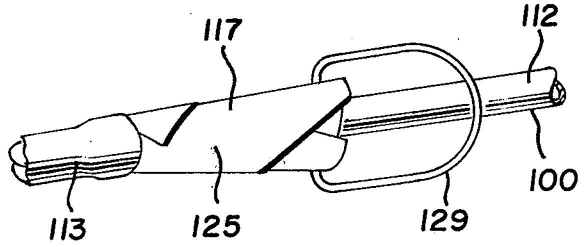
Figure 21:
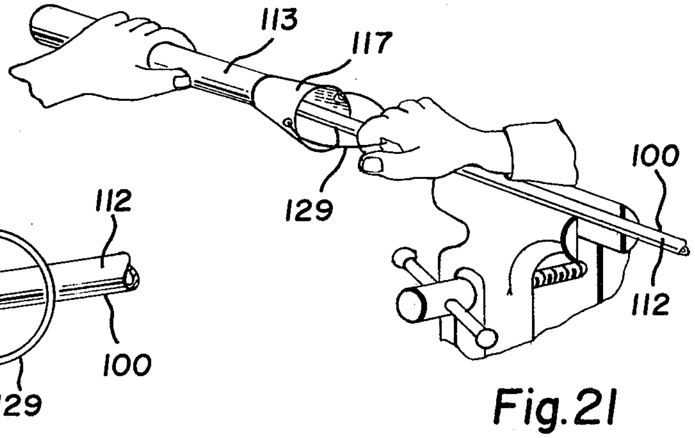

The expander is inserted into the open end of the grip, as shown in FIG. 20, and the shaft 112 of the golf club is inserted into the expander. Then, as is shown in FIG. 21, the shaft is held in a vise. The user's left hand is used to push the grip 113 onto the end of the golf club shaft 112. In performing this operation, it is desirable that the handle 129 be located above the golf shaft, so that the right hand can be used to pull on the handle and remove the expander 117 as the grip is forced onto the golf club shaft. If this operation is performed smoothly, the shaft will be well into the interior of the grip by the time the expander has left the grip and now resides on an intermediate portion of the shaft. If the expander is constructed with fairly flexible sheet metal, it will be possible to uncoil it to remove it from the golf shaft.

It is obvious that minor changes may be made in the form and construction of the invention without departing from the material spirit thereof. It is now, however, desired to confine the invention to the exact form herein shown and described, but it is desired to include all such as properly come within the scope claimed.

The invention having been thus described, what is claimed as new and desired to secure by Letters Patent is:

1. Awl for use in removing an old grip from a golf club shaft, comprising:

(a) a handle provided with an elongated notch, and (b) an elongated blade which is parallel with the notch and is tapered to a point at the end farthest from the handle, the blade being provided with a flat surface on the side that faces in the same direction as the notch and a convex arcuate surface on the opposite side, the flat surface extending through substantially the entire length of the blade, the notch being open at its ends and having a bottom surface that lies approximately on an extension of the flat surface of the blade.

* * * * *